United States Patent [19]

Manchester, Jr.

[11] 3,999,876
[45] Dec. 28, 1976

[54] COUPLING DEVICE

[75] Inventor: Isaac F. Manchester, Jr., Fall River, Mass.

[73] Assignee: FAS/CON Systems, Inc., New Bedford, Mass.

[22] Filed: Dec. 15, 1975

[21] Appl. No.: 640,941

[52] U.S. Cl. .............................. 403/316; 403/353; 16/172; 24/201 L
[51] Int. Cl.² ...................................... F16G 11/00
[58] Field of Search ................. 403/315, 316, 353; 16/171, 172; 24/201 L, 201 HE, 201 S, 230 BC, 236, 241 S, 230.5 S

[56] References Cited

UNITED STATES PATENTS

| 458,881 | 9/1891 | Wood et al. .......................... 24/225 |
| 592,733 | 10/1897 | Jay ...................................... 24/77 R |
| 693,546 | 2/1902 | Johnson ......................... 24/230 BC |
| 1,868,508 | 7/1932 | Stewart ............................... 403/353 |

Primary Examiner—Andrew V. Kundrat
Attorney, Agent, or Firm—Salter & Michaelson

[57] ABSTRACT

A coupling device including a first member that is formed with a hooked-shaped element having a circular opening and an elongated slot that communicates with said opening, and a second member having a connecting portion that includes a circular bar and at least one leg interconnected thereto, said bar and leg being movable through said slot in oriented relation for location in said opening, wherein the bar is rotatably positioned in the opening in the hook-shaped member for coupling the members together for relative movement therebetween. A resilient friction element is mounted on the first member and partially extends into and obstructs the entrance portion of said slot as formed therein so as to prevent the members from being inadvertently disconnected.

9 Claims, 9 Drawing Figures

U.S. Patent  Dec. 28, 1976  3,999,876
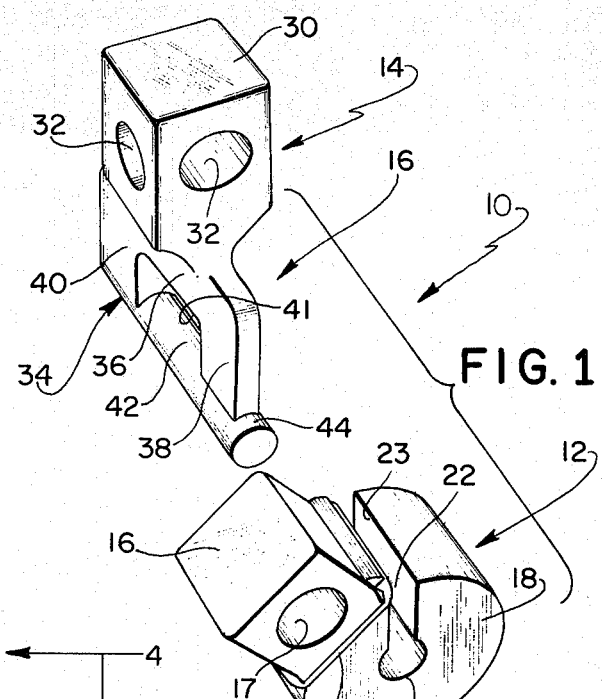
FIG. 1
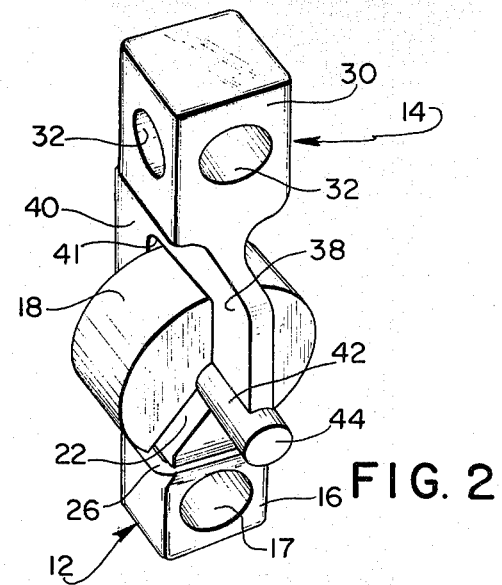
FIG. 2
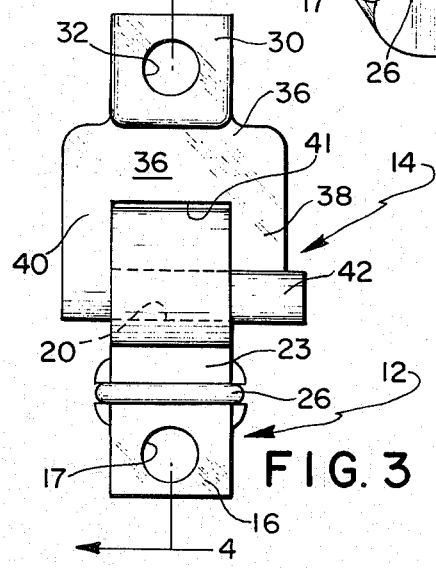
FIG. 3
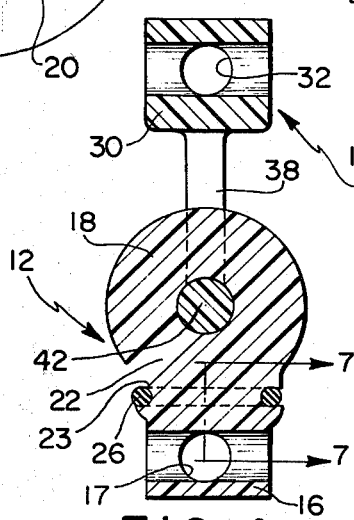
FIG. 4
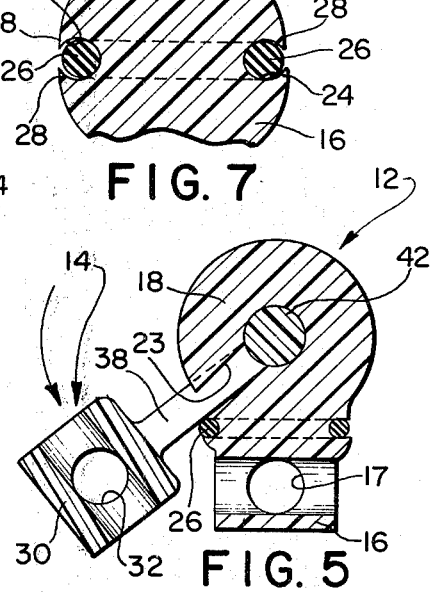
FIG. 7
FIG. 5
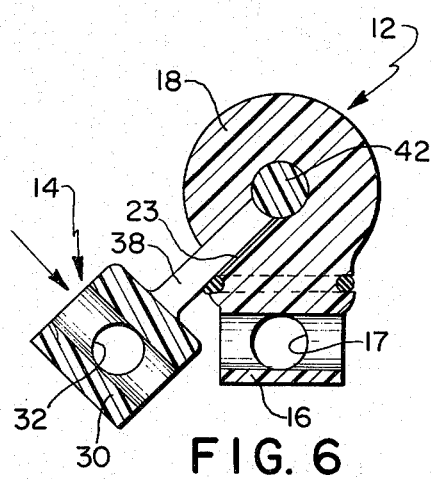
FIG. 6
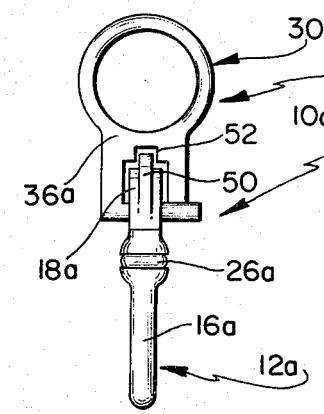
FIG. 8
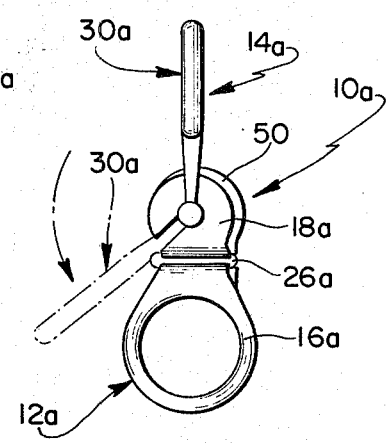
FIG. 9

COUPLING DEVICE

BACKGROUND OF THE INVENTION

This invention relates to coupling devices, and in particular relates to coupling devices of the quick assembly and disassembly type. Coupling devices in general have had wide spread use for a variety of purposes; but, as will be described, the device of the present invention has particular application for marine purposes in joining lines to sail members or as part of a towing bridle or tow line for disabled craft. Quick connect and disconnect couplings of the general type are well known as evidenced by the devices illustrated in U.S. Pat. No. 458,881 and No. 592,733; and, although such devices were found to be adequate for coupling elements together which were under tension, these prior known devices did tend to accidentally disengage when the lines to which the coupling elements were connected were relaxed. Hence the only useful application of the prior known devices required the maintaining of sufficient tension on the coupling lines so as to prevent the disengagement of the coupling elements.

SUMMARY OF THE INVENTION

The present invention accomplishes the purpose of positively maintaining coupling elements in assembled position while avoiding the objections to the prior art devices by the use of a quick assembly coupling device that includes a first member having a body portion to which a hook-shaped element extends outwardly therefrom. The hook-shaped element has a circular opening extending laterally therethrough, a narrow, radially, inwardly directed, elongated slot extending therefrom to the outer surface of the element. The coupling device also includes a second member having a connecting portion on which at least one outwardly and laterally extending leg and a laterally extending bar are formed, the bar being received by said opening when the leg and bar of said second member are aligned with said slot, and thereafter rotated relative thereto to a coupled position. Formed on the first member adjacent to the slot therein and inwardly projecting thereinto so as to partially obstruct the full width thereof is a resilient friction element that is engageable by the leg of the second member for preventing the inadvertent removal of the bar from the slot, wherein accidental disengagement of the members is prevented.

It is therefore a primary object of the present invention to provide a quick assembly coupling device which when assembled is provided with means by which the mating elements thereof are prevented from accidentally disengaging.

Another object of the present invention is the provision of a quick assembly coupling device which not only may be rapidly assembled and disassembled, but further, when assembled, is maintained against accidental disassembly regardless of whether tension is maintained on the individual members thereof.

A still further object of the present invention is the provision of a quick assembly coupling device having a pair of members that are interconnectable for rotation at the first angular disposition relative to each other, and are rotatable to a different and fully assembled operable angular position, wherein a bar of the first member is engageable with an opening in the second member and is maintained in such position by a friction element in the form of a resilient ring that contacts portions of the first member when the members are coupled or are to be coupled.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention:

FIG. 1 is an exploded perspective view of the coupling device of the present invention showing the coupling members prior to the assembly thereof;

FIG. 2 is a perspective view showing the coupling members in the assembled position thereof;

FIG. 3 is a front elevational view of the assembled coupling as viewed from the left in FIGS. 1 and 2;

FIG. 4 is a sectional view taken along line 4—4 in FIG. 3;

FIG. 5 is a sectional view of the coupling device similar to that illustrated in FIG. 4, showing the pivotal movement of one member toward a disassembly position, whereby a frictional element is contacted to prevent the accidental disengagement of the members;

FIG. 6 is a sectional view similar to FIG. 5 showing the compression of the friction member by the pivoted member when the members are to be disassembled;

FIG. 7 is an enlarged sectional view taken along line 7—7 in FIG. 4;

FIG. 8 is a front elevational view of a modified form of the coupling device; and FIG. 9 is a side elevational view of the modified coupling device showing the movement in phantom of one member from its fully connected position to a disassembly position.

DESCRIPTION OF THE INVENTION

Referring now to the drawing and particularly to FIGS. 1 and 2, the quick assembly coupling device embodied in the instant invention is illustrated and is generally indicated at 10. The coupling device 10 includes a pair of members generally indicated at 12 and 14 that are engageable for relative rotational interconnection with each other. The member 12 includes a body portion 16 having an opening 17 extending therethrough and a hook-shaped element 18 that is integrally joined to the body portion 16 and extending outwardly therefrom. The opening 17 and a corresponding opening formed in the member 14 are adapted to receive the end of a flexible member, or in the event the invention is used for marine purposes the openings receive lines, halyards, or the like, wherein the coupling device 10 detachably connects halyards to sail support members, lines to lines, or lines to stationary eyes or rings and the like. The members 12 and 14 may also be formed of any suitable material in any convenient manner. However, the members are preferably molded of tough plastic composition such as the material sold under the trademark "Delrin" and produced by DuPont.

Although specific reference is made herein to sailing and nautical terms are employed in connection therewith, it is understood that the present invention is not limited to only marine uses and has general utility as a coupling device in other areas where the need for a quick assembly and disassembly coupling exists.

The hook-shaped element 18 of the member 12 also has a circular opening 20 extending laterally therethrough, a laterally extending slot 22 being directed radially inwardly from an outer entrance portion 23 thereof on the surface of the element 18 for communication with the opening 20. Formed in the member 12 at the junction of the body portion 16 and the hook-shaped element 18 and adjacent to the entrance portion 23 of the slot 22 is a circumferential groove 24 (FIG. 7) that receives therein a ring 26 formed of a relatively soft compressible material such as silicon rubber or the like, the ring 26 not only being capable of withstanding exposure to the elements, but also having memory characteristics that provide for return to its original shape after compression. As illustrated in FIG. 7, the groove 24 is of a depth at least equal to the diameter of the ring 26 so as to be protected from chafing due to contact with implements or boat portions during use of the device. The portion of the body portion 16 adjacent to the groove 24 is formed with inwardly directed ledges 28 which act to confine the ring 26 therein and which also provide that the ring is yieldably snapped into the groove 24 during the assembly thereof. The relatively deep indentation of the groove 24 into the body portion 16 as illustrated in FIG. 7 is provided on three sides only thereof, that is, the groove 24 is formed with a circumferential discontinuity at the portion thereof that is located adjacent to the entrance portion 23 of the slot 22. Thus, as illustrated in FIGS. 4–6, the ring 26 projects slightly inwardly into the entrance portion 23 of the slot 22 and, in effect, defines an obstruction therein for the purpose of maintaining the member 14 in assembled position with the member 12 as will be more fully described hereinafter. It is also seen that only one portion of the ring 26 is fully exposed for contact at any time, and thus, the ring can be shifted as each exposed area becomes worn, whereby the useful life of the ring is materially increased.

Referring again to FIGS. 1 and 2 the second member 14 is shown including a body portion 30 formed with cross openings 32 for receiving an element therein that is to be interconnected by the coupling device 10. Integrally joined to the body portion 30 and projecting outwardly therefrom is a connector portion generally indicated at 34 having a root portion 36 to which outwardly projecting spaced legs 38 and 40 are joined. Connected to the terminal portions of the legs is a bar 42 of circular cross-sectional configuration to which an integral extension 44 is joined, the extension 44 projecting outwardly slightly beyond the leg 38 to define a guide for assisting initial entry of the bar 42 into the opening 22 upon the interconnection of the members 12 and 14. The legs 38, 40 and the bar 42 of the connector portion 34 define an aperture 41 therebetween for receiving the hook-shaped element 18 while the diameter of the bar 42 is such that it is receivable in the opening 20 so as to permit relative rotation between the members 10 and 12. In order to provide a stop for the assembled members, the leg 40 is formed slightly thicker in cross-section than the leg 38. Thus, the leg 38 is insertable through the slot 22 as the bar 42 is received in the opening 20, the leg 40 engaging the side face of the element 18 in the assembled position of the members as illustrated in FIG. 3. In such position the leg 38 has been projected through the slot 22 and extends outwardly on the other side thereof, the inwardly directed face of the element 18 abutting the inner portions of the leg 40 to form a stop therewith. In this position the hook-shaped element 18 and bar 42 are rotatable relative to each other, the element 18 being receivable within the aperture 41 of the connector portion 34.

It is seen that in the assembled position, the coupling device 10 is operable to interconnect elements that are attached through the respective openings 17 and 32 to members 12 and 14 when such members are interconnected to each other. In this connection the members 12 and 14 are quickly and easily connected or disconnected because of the unique construction thereof and that use of snap hooks, toggles, screws, bolts and the like is avoided. It is also seen that in such assembly it is necessary that the forward and side portions of the leg 38 of the member 14 compress the ring 26 so as to gain access through entrance of the slot 22. Since the ring 26 projects into the entrance of the slot 22 as shown in FIG. 5 it acts to prevent the accidental disassembly of the coupling member 12 and 14 from each other. Thus, when the member 14 is rotated to an assembly or disassembly position as shown in FIG. 5, the ring 26 is contacted by the root portion 36 of the connector element 34 to displace the member 14 in such a manner that its leg 38 is slightly misaligned with the slot 22. If the members 12 and 14 are to be disassembled, the member 14 must be deliberately moved a further distance to compress the yieldable ring 26 thereby aligning the leg 38 with the slot 22 and enabling the member 14 to be withdrawn through the slot 22. With the member 12 disposed in an upright position, the slot 22 is located such that a line extending therethrough to the center of the opening 20 defines an angle with the vertical of approximately 100°–135°. This relationship insures that the element 18 will not accidentally disconnect from the element 34 when the members 12 and 14 are located under tension in the assembled position thereof.

A modified form of the invention is illustrated in FIGS. 8 and 9 and is similar to the embodiment shown in FIGS. 1–7, except that the construction is adapted for fabrication of a metal material rather than molded of a plastic resin as indicated above. A member 12a includes a body portion 16a formed in ring-like configuration to which hook-shaped element 18a is joined. A flange 50 is formed on the hook-shaped element 18a and defines a guide therefor as will be described. A slot and opening are also formed in the element 18a as described above for the corresponding element 18. A second element 16a includes a ring-like portion 30a to which a connecting portion having a root portion 36a is joined, a recess 52 being formed in the connecting portion that receives the flange 50 in guiding relation. The connecting portion includes a bar and legs that cooperate to define a slot for receiving the element 18a in the assembled position of the members 12a and 14a, and a compressible ring 26a is located in a groove formed in the member 12a between the elements 16a and 18a. The compressible ring 26a is engageable by the element 18a to prevent accidental disassembly of the members during use of the device.

It is apparent from the foregoing description that the coupling device 10 defines a simple, economical, lightweight yet durable fastener coupling element having use for marine purposes and wherever conventional fasteners are now utilized, and also for other applications wherein a conventional fastener may not be suitable. The novel structure of the present fastener provides for rapid engagement and disengagement of the coupling members and substantially eliminates accidental separation of the members after they are engaged and in use.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A quick assembly coupling device of the type having a pair of members adapted for relative rotational interconnection, comprising a first of said members having a body portion and a hook-shaped element extending outwardly therefrom, said hook-shaped element having a circular opening extending laterally therethrough and a narrow elongated slot extending radially inwardly from an entrance thereof and communicating with said opening, the second of said members having a body portion and a connecting portion extending outwardly therefrom, and adapted to interconnect with the hook-shaped element of said first member, said connecting portion having a root portion and a laterally extending circular bar of a diameter greater than the thickness of said slot and spaced from said root portion and connected thereto by at least one leg so as to form an aperture therebetween, said one leg being of a thickness less than both the diameter of said bar and the thickness of said slot, said one leg being receivable in said slot, whereby said bar is engaged within said opening and said hook-shaped element is received within said aperture upon relative rotation of said members, stop means for preventing said connecting portion from passing entirely through said slot upon initial interconnection of said members, and means for preventing accidental disassembly of said members, said preventing means partially obstructing the entrance portion of said slot and being yieldable upon a force applied thereto to permit assembly and disassembly of said members.

2. The coupling device of claim 1, said yieldable preventing means being positioned adjacent to the entrance of said slot.

3. The coupling device of claim 2, said preventing means comprising a yieldable ring received within a channel formed in said body portion of said first member.

4. The coupling device of claim 1, said stop means comprising a second leg laterally spaced from said one leg, said bar extending across and connecting said legs, said second leg of a greater thickness than said slot.

5. The coupling of claim 4, said preventing means including a channel disposed in said body portion adjacent to said slot entrance, a ring being received in said channel and partially obstructing said slot entrance, and being sufficiently yieldable to permit passage there past of said one leg.

6. The coupling of claim 5, said channel extending circumferentially about said body and shielding said ring except across said slot.

7. The coupling of claim 6, said channel extending to a depth of at least equal to the thickness of said ring and having an entrance face portion thereof slightly smaller than the ring thickness.

8. The coupling of claim 5, portions of said ring extending across said slot and being engageable with said root portion of said jaw when said members are disposed in a position of relative rotation.

9. The coupling of claim 5, portions of said ring extending across said slot for contact with said root portion of said jaw when said members are disposed in a maximum relative rotational position so as to slightly offset said one leg from alignment with said slot to assist in maintaining the interconnected position of said members.

* * * * *